July 27, 1954 R. A. DOMINGUEZ 2,684,525
VALVE RECONDITIONING JIG APPARATUS
Filed March 12, 1951 2 Sheets-Sheet 1

INVENTOR
RICHARD A. DOMINGUEZ
BY
ATTORNEY

July 27, 1954 R. A. DOMINGUEZ 2,684,525
VALVE RECONDITIONING JIG APPARATUS
Filed March 12, 1951 2 Sheets-Sheet 2

INVENTOR
RICHARD A. DOMINGUEZ
BY
ATTORNEY

Patented July 27, 1954

2,684,525

UNITED STATES PATENT OFFICE 2,684,525

VALVE RECONDITIONING JIG APPARATUS

Richard A. Dominguez, Richmond, Calif.

Application March 12, 1951, Serial No. 215,161

3 Claims. (Cl. 29—284)

This invention relates, in general, to the reconditioning of the valve seat and plug sealing surfaces of a valve, and more particularly, to a jig apparatus for facilitating such reconditioning apparatus.

Enormous numbers of valves, which are employed to control the flow therethrough of fluids and/or gases, include therein a plug carried by the valve stem which is raised to open and lowered to close an orifice encompassed by a valve seat formed in the body of the valve by manipulation of said valve stem. The efficiency with which the valve accomplishes its function depends primarily upon the quality of the fit of the contact surfaces of the plug member with the valve seat encompassing the marginal edge of the orifice.

After a period of use the seating or sealing contact surfaces of the plug or of the valve seat become eroded and the valving efficiency is impaired. Finally the erosion of the seating surface renders the valve inoperative and the valve must be replaced. Usually the valve is replaced with a new valve.

Heretofore, the old valves have generally been discarded as there has not been available either the tools or the facilities required for the reconditioning of the seating surfaces. The problem of reconditioning such surfaces is complicated due to the large number of sizes and the many styles in which said valves are provided. Therefore, the cost of a new valve has been required to be borne by the trade and many otherwise quite serviceable valves have been discarded merely because of the eroded seating surfaces.

The present invention provides apparatus comprising a jig whereby the reconditioning of the valve seating surfaces is facilitated, which jig is adapted to accommodate a large number of valve sizes and valve body styles. In general, the apparatus of the invention is adapted to retain the valve member in proper alignment while the appropriate tool is applied to the seating surface during the reconditioning operation thereby assuring the proper fit of the seating surfaces required for high valving efficiency.

Accordingly it is an object of the invention to provide a jig apparatus for retaining a valve member during the reconditioning of the seating surface thereon in proper alignment to assure proper fit of the reconditioned valve seating surfaces.

Another object of the invention is to provide a jig apparatus for retaining a valve member during the reconditioning of a seating surface thereon which is adapted to receive members derived from valves of a large variety of sizes and body styles.

A further object of the invention is to provide a jig apparatus especially adapted for retaining a valve member in alignment while a grinding or cutting tool is applied to the seating surface for the reconditioning thereof.

A still further object of the invention is to provide a jig apparatus for retaining a valve member during the reconditioning of a seating surface whereby said reconditioning is facilitated and may be accomplished with a minimum expenditure of time and expense.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by said drawing and description may be adopted within the scope of the invention as set forth in the claims.

Referring to the drawing.

Figure 1:
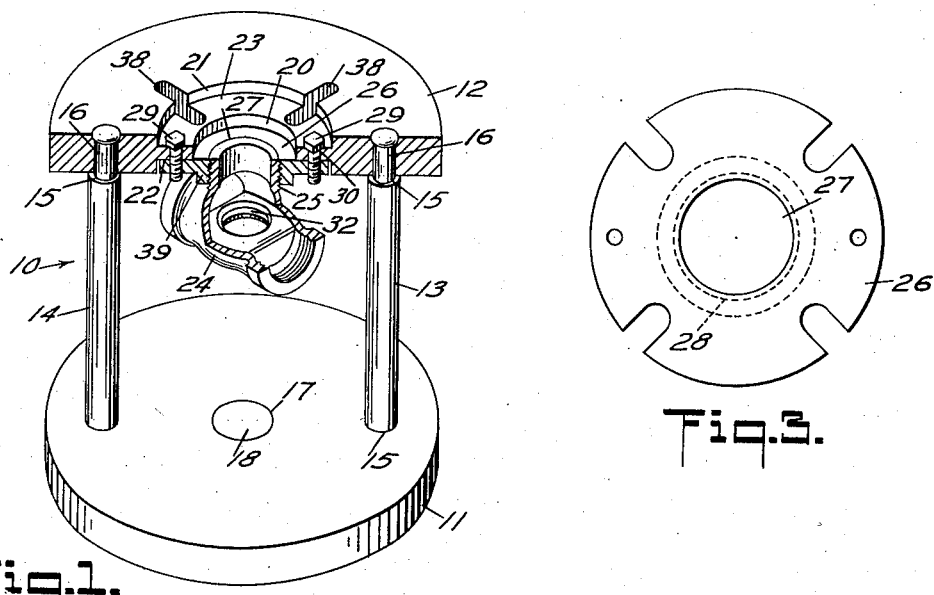
Figure 1 is a perspective view partially broken away illustrating a globe valve body in proper position for reconditioning of the valve seat.

In general the jig apparatus of the invention comprises a basic structure which may be mounted on a machine tool which imparts thereto a rotary motion and which is adapted to retain a valve member in axial alignment with said rotary motion in order that a cutting or grinding reconditioning tool may be applied to the seating surface thereof. Alternatively, the jig apparatus may be stationarily mounted and a rotating reconditioning tool, such as a cutter mounted on a boring bar axially aligned with said jig apparatus and therefore said valve member, may be applied to the seating surface of the valve member. Also there is provided adaptors for accommodating a variety of sizes and styles of such valve members as will be more fully described hereinafter.

More particularly and with reference to the accompanying drawing, the basic structure of the jig apparatus generally indicated at 10 may be seen to comprise a massive flat circular plate 11 and a massive annular ring member 12 constituting a work face plate supported in spaced parallel relation as by a pair of diametrically opposed columnar bars 13 and 14 which are firmly affixed in any convenient manner by the ends thereof to said plate 11 and ring 12. For example as shown the ends of the bars 13 and 14 may be constructed so as to provide shoulders 15 which abut against the inner surfaces of said plate 11 and ring 12 when the constricted ends of said bars 13 and 14 are inserted in perforations 16 appropriately provided in said plate 11 and ring 12. In order to maintain the bars in place the ends of the bars may be peened over.

For mounting the basic jig structure 10 on a machine tool (not shown) with which it is to be employed the plate 11 may be provided with a variety of mounting means. For example, if the jig apparatus 10 is to be employed with a lathe having a chuck attachment, the plate 11 may be provided with an accurately centered threaded perforation 17 into which may be inserted a threaded stub shaft 18 having a shoulder 19 accurately machined perpendicular to the longitudinal axis thereof whereby as the shaft is screwed inwardly the shoulder 19 abuts against the outer surface of the plate 11 providing accurate perpendicular axial alignment of the shaft 18 with the plate 11 and ring 12. The stub shaft 11 may appropriately also be employed to mount the jig apparatus in a vise or otherwise upon the work table of a boring mill or drill press.

Alternatively, by providing an appropriately threaded perforation 17 in the plate 11 the jig apparatus may be mounted on the threaded head stock shaft (not shown) of a suitable lathe in much the same manner as a chuck is commonly mounted thereon. Said threaded perforation 17 conveniently being adapted to accommodate said stub shaft also. In the foregoing manner the basic jig structure 10 may be mounted on a variety of machines whereby there is produced a relative rotary motion between the reconditioning tool and a valve member retained thereon.

Now there will be described in particular detail the work face plate 12, manner of mounting valve members therein and method of employing the jig apparatus for the reconditioning of the seating surfaces on said valve member.

In order to accommodate work retaining adaptors and accessories, the annular ring member is machined adjacent the central opening 20 therein to provide outer 21 and inner 22 recessed shoulders accurately plane surfaced perpendicular to the axis of said stub shaft 18 whereby there is formed a constricted ring portion 23 accompanying the marginal edge of said opening 20.

For mounting a globe valve body 24 of the type which has a threaded neck portion 25 normally employed to the bonnet mounting ring (not shown) there may be provided a circular adaptor plate 26 of a size fitting snugly against the inner recessed shoulder 22 having a centrally disposed opening 27 provided in the marginal edge thereof with threads 28 adapted to receive the threaded neck portion 25 of the valve body 24 therein. Preferably the adaptor plate 26 is retained in position by cap screws 29 inserted through snug-fitting perforations 30 formed in the constricted portion 23 of the ring 12 and engaging the threaded perforations 31 formed in the adaptor plate 26.

As the threaded neck portion 25 of the valve body 24 is generally accurately machined with respect to the axis of the valve seat 32 it may be seen that the above-described method of mounting positions the axis of said valve seat 32 coincident with the longitudinal axis of the shaft 18 and thereby the seat 32 is accurately rotated in a plane perpendicular to said longitudinal axis. Accordingly the seat may then be accurately machined by a suitable reconditioning tool (not shown) such as a reamer, rosette, boring bar which is applied in an appropriate fashion in a direction coincident or parallel to said longitudinal axis as relative motion between the tool and valve body is provided as described hereinbefore.

Figure 4:
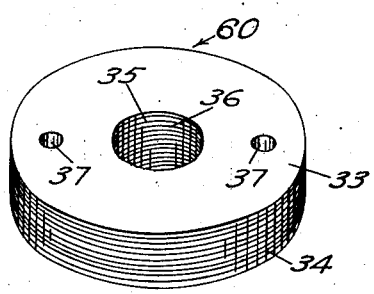
Figure 4 is a perspective view of a bushing adaptor element for employment with the apparatus of Figure 1.

In practice it has been found preferable to provide a plate 26 designed to accommodate a relatively large valve body member, and to employ a number of bushing adaptors indicated in Figure 4 by the numeral 60 comprising, for example, a relatively thick annular ring member 33 provided with threads 34 adapted for engagement with threads 28 of plate 26 and with threads 35 in the marginal edge of the opening 36 adapted to accommodate the threaded neck portion of a valve body of a valve of smaller size than the valve body 24. The adaptor bushing 60 may be rotated into position by engaging the holes 37 formed in the face thereof with a spanner wrench.

It is advantageous for the purpose of accommodating a large number of body sizes to provide a graded assortment of plates 26 to accommodate selected sizes of valve bodies and to provide a selected assortment of the adaptor bushings 60 for accommodation of the intermediate valve body sizes. Accordingly, in the above-described manner it may be seen that mounting of a large variety of valve body sizes is provided for.

The basic jig structure may also be adapted to accommodate that type of valve wherein the bonnet is secured by a flanged portion thereof to the valve body by means of a series of stud bolts. In such a valve the area of the body contacting such flange is generally a plane having a gasketing groove provided therein or may have associated therewith a true boss which provides correct alignment of the bonnet and valve body.

Figure 3:
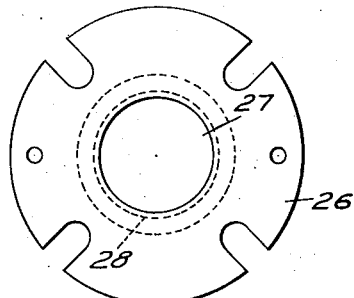
Figure 3 is a plan view of an adaptor element as used with the apparatus of Figure 1.
Figure 2:
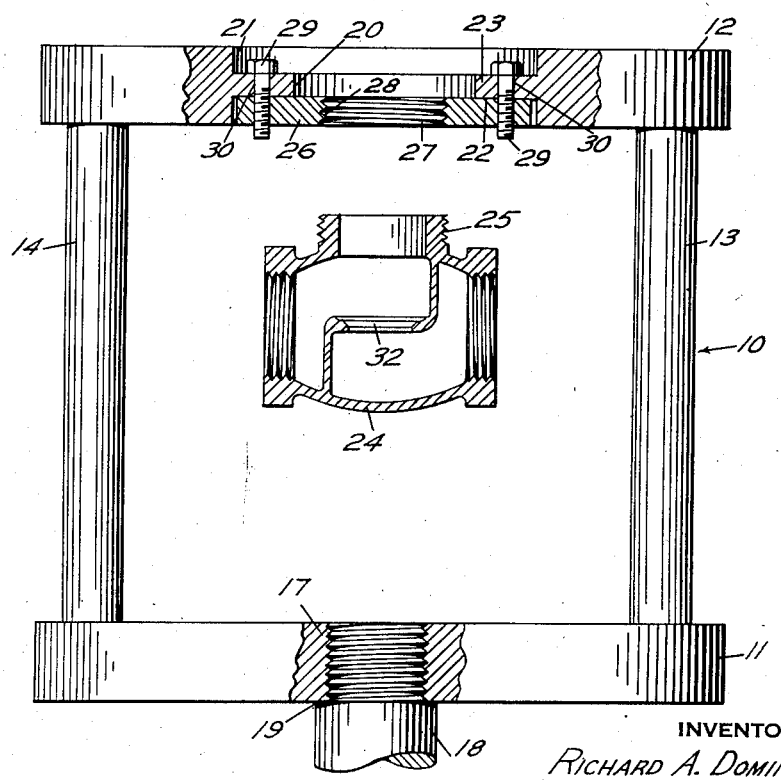
Figure 2 is a cross sectional view of the jig apparatus taken along the vertical plane 2—2 which bisects the apparatus of Figure 1 but showing the valve body exploded from the position occupied in Figure 1.

For securing the body of such a valve to the work face plate 12 an appropriate number of radially oriented slots 38 constituting a single pattern or several patterns designed to accommodate various bolt arrangements are provided in the work face plate 12 which slots may extend beneath the adaptor plate 26 in which event the adaptor plate 26 is correspondingly slotted as shown in Figure 3. The stud bolts of the valve body may then be inserted through the slots 38 and secured by means of nuts (not shown). It will be apparent that, by employing slots so constructed, a number of valve body sizes may be accommodated by a single jig structure 10.

To provide for correct and positive alignment of the valve body the true boss may be brought into uniform contact with an aligned surface on the jig structure 12 or of the adaptor plate 26. In the event that the valve body has no true boss, a true boss 39 may be provided against which the plane contact surface of the valve body is brought into uniform contact and, moreover, if a gasketing groove is provided thereon, the boss may be formed as to rest in close proximity thereto to effect correct alignment.

Advantageously, the outer recessed shoulder portion 21 may be employed to face off adaptor plates 26 and bushing adaptors 60 merely by securing said plates 26 and adaptor 60 thereto with the surface to be machined facing outward. In this fashion there may be provided a face on said adaptor members which is in a plane perpendicular to the longitudinal axis of the jig.

Figure 5:
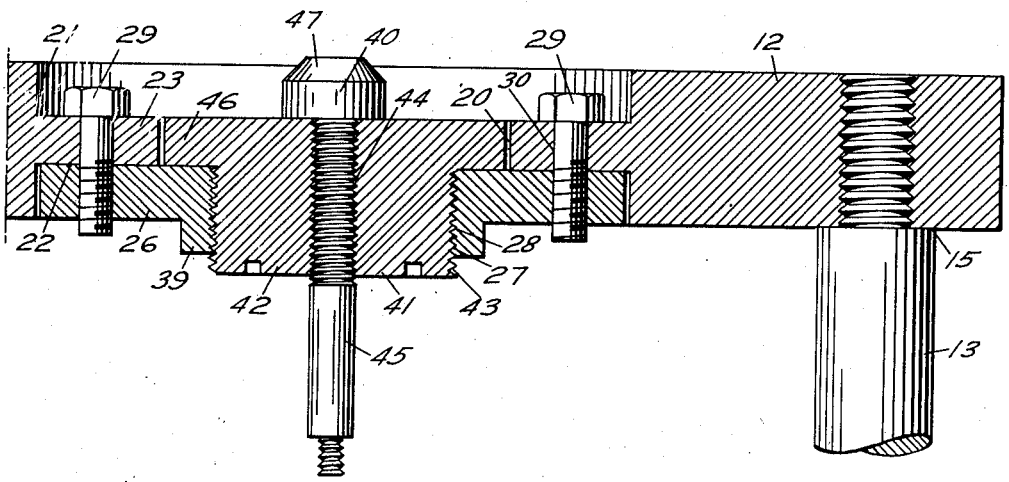
Figure 5 is a partial sectional view of the jig apparatus illustrating a manner of mounting a valve plug member of a globe valve therein.

As shown in Figure 5, the jig apparatus structure 10 may be adapted to position and retain the valve plug 40 by providing a valve plug bushing adaptor 41 which may be constructed as a generally cylindrical body 42 having peripheral threads 43 which are adapted to engage threads 28 of plate 26 and a central longitudinal threaded perforation 44 into which the threaded valve stem 45 which carries said plug 40 may be screwed and so that the rear surface of the plug 40 abuts against the body 42 and is thereby retained. Also the valve plug bushing adaptor 41 may be provided with a peripheral shoulder 46 which abuts against the outer side of the plate 26 and thereby serves as a stop member. In this fashion the longitudinal axis of the valve stem 45 is coincident with the longitudinal axis of the basic jig structure 10 and is thereby in proper position for reconditioning of the seating surface 47 as by machining in a lathe.

Figure 6:
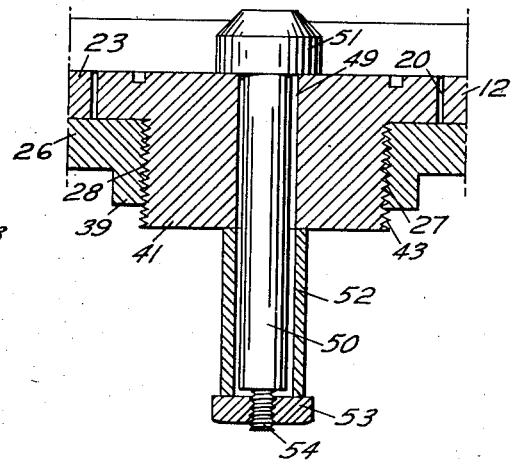
Figure 6 is a vertical cross sectional view of and illustrating an alternative method of mounting a valve stem and plug in an adaptor employed with the jig apparatus of Figure 1.

Alternatively, and especially for valve stems which are not threaded, the arrangement illustrated in Figure 6 may be employed. As shown, a valve plug bushing adaptor 41 in which, however, the central perforation 49 is not threaded, may be provided in such a case. In order to retain and position the valve stem 50 and plug 51, a sleeve 52 is positioned around the valve stem so as to abut one end thereof against the inner surface of the plug 51 and a nut 53 is applied to the threaded portion 54 so as to abut against the second end thereof. Accordingly, the longitudinal axis of the valve stem 50 and plug 51 are in coincident alignment with the longitudinal axis of the jig apparatus 10 when the valve plug adaptor bushing 48 is engaged by the threads 28 of plate 26.

In the foregoing manner there has been provided adaptor means for positioning and retaining a valve stem carrying a valve plug upon the basic jig structure 10.

In the present instances it is intended that the term "valve member" indicate an element of a valve including a seating surface comprising a contact surface for cooperation with a mating element. The term "seating surface" is intended to indicate the contact surface of a valve plug against a valve seat when the valve is in the closed position.

I claim:

1. A jig apparatus for facilitating the reconditioning of the seating surface of a valve member comprising, an annular work face plate provided with a central opening extending entirely therethrough and including a radial shoulder extending into said opening intermediate the ends thereof, means for supporting said face plate to provide a space beneath said face plate and for transmitting thereto relative rotation with respect to an externally-mounted reconditioning tool, an annular adaptor plate disposed in said opening in abutting relation to said shoulder and adjacent to said space, means for securing said adaptor plate to said face plate, and means on said adaptor plate for supporting and retaining a valve member within said space in a position such that the central axis of said seating surface is coincident with said center of rotation and said seating surface is accessible through said work face plate from without said central opening.

2. A jig apparatus for facilitating the reconditioning of the seating surface of a valve member comprising, a massive annular ring face plate having a recessed portion encompassing the central opening thereof and supported in spaced parallel relation to a massive circular plate to provide a space therebetween, a stub shaft secured to the outer surface of said massive circular plate, an adaptor plate constructed to support said valve member in said space, said adaptor plate being disposed within said recessed portion of the face plate and secured thereto whereby said valve member is retained in a position such that the central axis of said seating surface is coincident with the longitudinal axis of said stub shaft, radially extending slot means in said adaptor plate and said face plate, and bolt means extending through said slot means for releasably securing said adaptor plate to said face plate.

3. The apparatus as defined in claim 2 wherein said adaptor plate is provided with a central threaded opening, and an adaptor bushing to accommodate said valve member having an outer threaded surface engageable in said adaptor plate opening.

References Cited in the file of this patent

UNITED STATES PATENTS

| Number | Name | Date |
| --- | --- | --- |
| 379,297 | Weiss | Mar. 13, 1888 |
| 500,748 | Smith | July 4, 1893 |
| 509,275 | Whiton | Nov. 21, 1893 |
| 612,378 | Childs | Oct. 11, 1898 |
| 638,905 | Casler | Dec. 12, 1899 |
| 1,073,362 | Redeker | Sept. 16, 1913 |
| 1,274,425 | Kytlica | Aug. 6, 1918 |
| 1,499,110 | Lakes | June 24, 1924 |
| 1,835,292 | Flodin | Dec. 8, 1931 |
| 2,345,604 | Jackson | Apr. 4, 1944 |